LAVINIA H. FOY. 2 Sheets--Sheet 1.
Skirt Supporting Corsets.
No. 4,831. Reissued March 26, 1872.
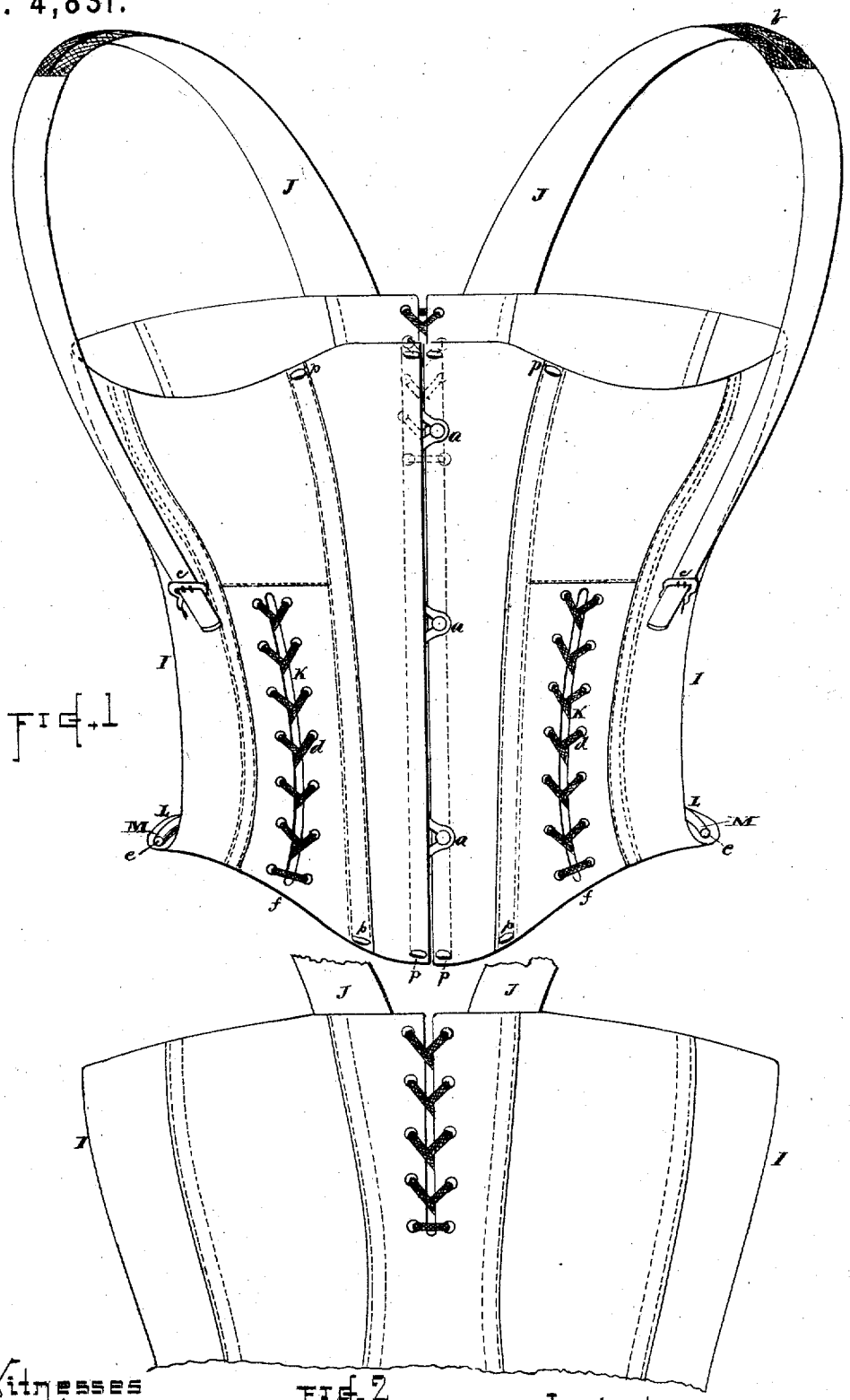
Witnesses
Michael R Conscoe
Chas R. Wheelon
Inventor
Lavinia H. Foy
AM. PHOTO-LITHOGRAPHIC CO. N.Y. (OSBORNE'S PROCESS.)

2 Sheets--Sheet 2.
LAVINIA H. FOY.
Skirt Supporting Corsets.
No. 4,831. Reissued March 26, 1872.
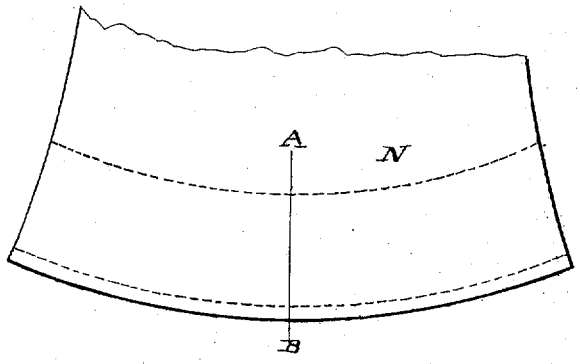
FIG. 3
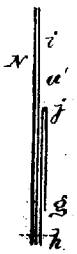
B
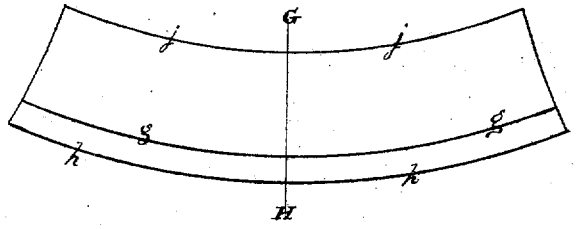
FIG. 6
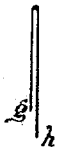
A
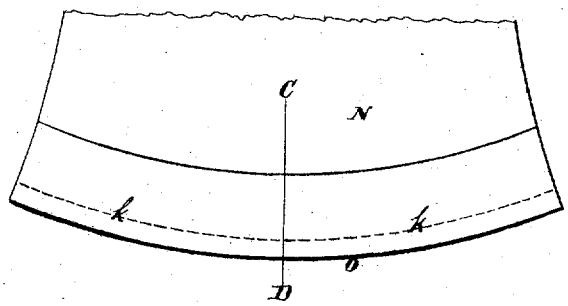
FIG. 4
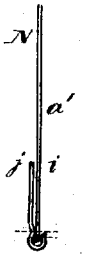
C
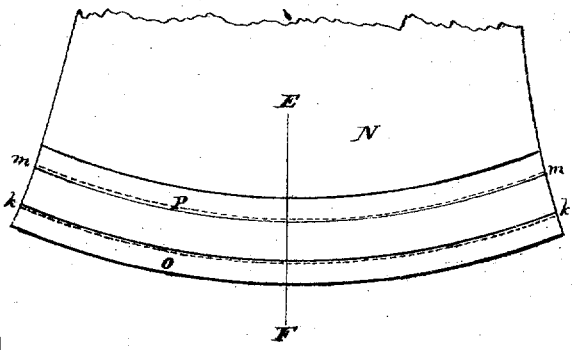
FIG. 5
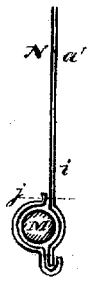
D
Witnesses
Michael R Enscoe
Chas R Wheeler
Inventor
Lavinia H. Foy
AM. PHOTO-LITHOGRAPHIC CO. N.Y. (OSBORNE'S PROCESS.)

UNITED STATES PATENT OFFICE.

LAVINIA H. FOY, OF NEW HAVEN, CONNECTICUT, ASSIGNOR, BY MESNE ASSIGNMENTS, TO HERSELF AND JAMES H. FOY.

IMPROVEMENT IN SKIRT-SUPPORTING CORSETS.

Specification forming part of Letters Patent No. 39,911, dated September 15, 1863; reissue No. 2,653, dated June 18, 1867; reissue No. 4,831, dated March 26, 1872.

*To all whom it may concern:*

Be it known that I, LAVINIA H. FOY, formerly of the city and county of Worcester and Commonwealth of Massachusetts, and subsequently of Boston, in said Commonwealth, but now of the city and county of New Haven, in the State of Connecticut, have invented certain new and useful Improvements in Skirt-Supporting Corsets; and I do hereby declare that the following is a full, clear, and exact description of the same, reference being had to the accompanying drawing forming a part of this specification, and in which—

Figure 1 represents a front view of my improved corset skirt-supporter. Fig. 2 represents a back view of the upper part or section thereof; while Figs. 3, 4, 5, and 6 and sections A, B, C, and D represent detached parts, and are designed more particularly to illustrate the forms of the bottoms of the pieces which form the extension rim or supporter, and the particular mode of binding the same, as will be more fully described hereafter.

The nature of my invention consists, first, in a corset having an extension provided with a case for the extensor-hoop, constructed of a bias-cut piece of cloth, whereby all gathering is avoided and a corded edge produced, as hereafter described; second, in a corset clasped in front and provided with a rear hooped extension, and with one or more laced openings; third, in a corset clasped in front and provided with a rear hooped extensor and front laced openings, as hereafter described; fourth, in a case for the extensor-hoop and corded edges O P, formed upon the back of the corset from the same piece of bias-cut cloth, folded and stitched, as shown and hereafter described.

In Fig. 1, I represents the body of the article, which is fastened in front by the metal clasps *a a a*, in the usual and well-known mode of fastening corsets in which steel springs are used. J J are the shoulder-straps, provided with elastics *b b*, their front ends being retained by the buckles *c c*, attached to the front of the body I, (see Fig. 1.) The back of the body I is left partially open and laced up, as fully shown in Figs. 1 and 2, whereby the upper part of the body I can be adjusted and the shoulder-straps thrown further off of the shoulders whenever desired. The front of the body I is left open, or is made with front longitudinal openings, as seen at K K, and provided with lacings *d d*, whereby the size of the central part of the body can be very quickly adjusted and varied in size, and that, too, without in the least impairing the form or action of the skirt-supporting rim L, since the openings K K are both in front of the points *e e* of the extensor L. If preferred, the openings K K could extend quite through the bottom of the body I, instead of being closed, as seen at *f f*. The extensor or supporting rim L is formed from the lower parts or bottoms of the pieces which go to make up the back of the body I, the general form of which is shown in the drawing, Figs. 3, 4, and 5. When these pieces are sewed together and the hoop M inserted the extensor or rim L is produced. The rim or extensor L is bound in a novel and peculiar manner, whereby the outer edge thereof has a corded appearance, while the binding-piece is made to answer as a case to receive and retain the hoop M. Strips of cloth of sufficient length and width to bind with are cut bias, and then one edge, *g*, is folded over, as seen in Fig. 6, when the single edge *h* is stretched so as to give the proper curved form, as indicated in the same figure. The binding-piece is then placed with its single edge *h* next to the lining *i* of the face-cloth N, as indicated in section-line B, which is designed to represent line A B, Fig. 3, when the parts are placed together for stitching. After the edges *h*, *i*, and N are stitched together, the loop part *j* is turned over upon the other side of the face-cloth F, so as to bring the edge *g* in close proximity to the edges *h*, *i*, and N, when all of the thicknesses are stitched together, just back of the first stitching, whereby the edges *h*, *i*, N, and *g* are all turned in and brought together outside of the seam *k*, Figs. 4 and 5, thereby giving the article the appearance of corded work, as seen at O, same figure. All that remains is to stitch another seam at *m*, when the loop M can be inserted, the article having the finished appearance indicated in Fig. 5. In the sections B C D of the lines A B, C D, and E F, the relative positions of the different thicknesses of cloth are represented in a loose and expanded condition, with a view to illustrate more clearly the mode of operation and binding. When, however, the stitching is performed, the parts are all drawn closely together and assume a compact and neat appearance, the edges O and P assuming rounded forms.

It will be observed that by folding the edge *g*, as shown, too much bulk and thickness are avoided in the outer seams and edge, and a neater piece of work produced than if the edge *g* were folded down even with the edge *h;* besides, the curved form is more readily produced by stretching a single edge, as shown.

If preferred, one or both of the openings K could be extended from top to bottom. *p p p p* are metal caps placed over the ends of the springs and whalebones.

Having described my improved corset skirt-supporter, what I claim therein as new and of my invention, and desire to secure by Letters Patent, is—

1. A corset, I, having an extensor, L, provided with a case for hoop M, constructed of a bias-cut strip of cloth, whereby all gathering is avoided and a corded edge produced.

2. A corset clasped in front and provided with a rear hooped extensor, and with one or more laced openings.

3. A corset, I, clasped in front, and provided with a rear hooped extensor, L M, and front-openings K K, substantially as and for the purposes described.

4. The case for the hoop and corded edge O P formed upon the back from the same piece of bias-cut cloth, folded and stitched, as shown and described.

LAVINIA H. FOY.

Witnesses:
MICHAEL R. ENSCOE,
CHAS. R. WHEDON.